US011558225B2

United States Patent
Hamamreh et al.

(10) Patent No.: US 11,558,225 B2
(45) Date of Patent: Jan. 17, 2023

(54) SECURE AND ADAPTIVE ORTHOGONAL DIVISION WAVEFORMS MULTIPLEXING SYSTEM USING CHANNEL-BASED TRANSFORMATION

(71) Applicant: Istanbul Medipol Universitesi, Istanbul (TR)

(72) Inventors: Jehad M. Hamamreh, Istanbul (TR); Hüseyin Arslan, Istanbul (TR)

(*) Notice: Subject to any disclaimer, the term of this patent is extended or adjusted under 35 U.S.C. 154(b) by 311 days.

(21) Appl. No.: 16/755,019

(22) PCT Filed: Aug. 30, 2018

(86) PCT No.: PCT/TR2018/050455
§ 371 (c)(1),
(2) Date: Apr. 9, 2020

(87) PCT Pub. No.: WO2019/098973
PCT Pub. Date: May 23, 2019

(65) Prior Publication Data
US 2020/0351649 A1 Nov. 5, 2020

(30) Foreign Application Priority Data
Oct. 23, 2017 (TR) .................................. 2017/16332

(51) Int. Cl.
*H04L 25/03* (2006.01)
*H04L 5/00* (2006.01)
(Continued)

(52) U.S. Cl.
CPC ........ *H04L 25/03343* (2013.01); *H04J 11/00* (2013.01); *H04L 5/0007* (2013.01);
(Continued)

(58) Field of Classification Search
None
See application file for complete search history.

(56) References Cited

U.S. PATENT DOCUMENTS 8,433,894 B2  4/2013 Reznik et al.
9,014,665 B2  4/2015 Shany et al.
(Continued)

FOREIGN PATENT DOCUMENTS

EP  0788264 A2  8/1997
KR  20060065355 A  6/2006
(Continued)

OTHER PUBLICATIONS

Li et al, "Waveform Design for Secure SISO Transmissions and Multicasting", IEEE Journal on Selected Areas in Communications, Sep. 1, 2013, IEEE Service Center, Piscataway, US, vol. 31, No. 9, pp. 1864-1874, XP011524965, 13710009 INSPEC E20133716722675 Compendex, ISSN 0733-8716, DOI:10.1109/JSAC.2013.130918 Sep. 1, 2013.

(Continued)

*Primary Examiner* — Scott M Sciacca
(74) *Attorney, Agent, or Firm* — Egbert, McDaniel & Swartz, PLLC

(57) ABSTRACT

Disclosed is a secure and adaptive waveforms multiplexing system in advanced-level wireless communication systems (such as 5G and beyond systems).

23 Claims, 6 Drawing Sheets

(51) Int. Cl.
 H04L 12/40 (2006.01)
 H04L 27/26 (2006.01)
 H04W 12/03 (2021.01)
 H04J 11/00 (2006.01)
 H04W 80/02 (2009.01)

(52) U.S. Cl.
 CPC .... *H04L 12/40104* (2013.01); *H04L 27/2634* (2013.01); *H04L 27/26412* (2021.01); *H04W 12/03* (2021.01); *H04J 2011/0013* (2013.01); *H04W 80/02* (2013.01)

(56) References Cited

U.S. PATENT DOCUMENTS

| | | | | |
|---|---|---|---|---|
| 2007/0237274 | A1* | 10/2007 | Nakache | H04L 27/2657 375/355 |
| 2008/0219447 | A1* | 9/2008 | McLaughlin | H04K 1/00 380/255 |
| 2009/0219803 | A1 | 9/2009 | Jwa | |
| 2010/0265999 | A1 | 10/2010 | Stern et al. | |
| 2014/0153723 | A1 | 6/2014 | McLaughlin et al. | |
| 2015/0280945 | A1 | 10/2015 | Tan et al. | |
| 2016/0226680 | A1* | 8/2016 | Jia | H04L 25/0222 |

FOREIGN PATENT DOCUMENTS

| | | | | |
|---|---|---|---|---|
| KR | 20080085321 A | | 9/2008 | |
| WO | WO-2017174122 A1 * | | 10/2017 | ........... H04B 7/0452 |

OTHER PUBLICATIONS

Yang et al. "Safeguarding 5G wireless communication networks using physical layer security", IEEE Communications Magazine, Apr. 1, 2015, IEEE Service Center, Piscataway, US, vol. 53, No. 4, pp. 20-27, XP011577571, ISSN 0163-6804, DOI:10.1109/MCOM. 2015.7081071 Apr. 1, 2015.

International Search Report for corresponding PCT/TR2018/050455.

Written Opinion of the ISA for corresponding PCT/TR2018/050455.

* cited by examiner

SECURE AND ADAPTIVE ORTHOGONAL DIVISION WAVEFORMS MULTIPLEXING SYSTEM USING CHANNEL-BASED TRANSFORMATION

TECHNICAL FIELD

The present invention relates to a secure and adaptive waveforms multiplexing system in advanced-level wireless communication systems (such as 5G and beyond systems).

BACKGROUND OF THE INVENTION

Considerable progress has been made in wireless communication systems over the past decade. New communication protocols (such as 3G and 4G) have emerged upon developing technology. In recent years, a new communication protocol enabling much faster data transfer than the said communication protocols have emerged. This protocol called as 5G may make persons in bad faith—who take advantage of security vulnerabilities—work easier while it provides a data transfer rate much higher than a conventional rate for users. A secure and fast wireless data transfer system is needed. In addition to this, adaptation problems of sent data have shown up with increase of diversity of electronic devices. It is required to develop an adaptive wireless communication protocol in order that the receiver side can receive the sent data efficiently.

Current wireless data transfer technologies use fixed waveforms at both receiver and transmitter sides. Although OFDM (Orthogonal Frequency Division Multiplexing) method overcomes the problem of inter-symbol interference caused by a frequency selective channel in broad-band wireless communication systems, this method confronts two major problems. Firstly, it results in a static, non-optimal transceiver design, where the Tx/Rx pulses are fixed and do not adapt to the channel variations, leading to error rate performance and efficiency limitation. Moreover, all CP-OFDM based waveforms discard the CP part of the signal at the receiver side before the FFT transform process, resulting in a loss of the leaked signal energy and non-optimal design, whereas in ZP-OFDM, the ZP part of the signal is cut along with the noise and added to the beginning part of the OFDM signal, making its performance like CP-OFDM. In the disclosed invention, the leaked signal energy is collected optimally by extracting, from the channel of the legitimate user, basis function transforms (i.e. waveforms), which are longer than that used at the transmitter by the channel spread length, resulting in a reliability enhancement, which increases with the channel length increase. Secondly, wireless networks being used in public areas are vulnerable to malicious use and they lead to security vulnerability. In the disclosed invention, physical layer security is provided by using channel-based transformation instead of Fourier transform, which is used in most OFDM-based waveforms. Thus, instead of using fixed exponential-basis functions as in OFDM, new basis functions, which are extracted from and adaptive to the channel of the legitimate user are used to modulate and demodulate the data symbols securely. Consequently, security becomes an inherent property of the inventive design, rather being an add-on to system, which may cause complexity and overhead in the system design. When problems of current wireless communication technologies are addressed, a wireless communication system which is secure and can adapt inter-channels is needed.

The Korean patent document no. KR20080085321, an application in the state of the art, discloses a distribution method which can be adapted in orthogonal frequency distribution systems.

The United States patent document no. US2009219803, another application in the state of the art, discloses an orthogonal frequency distributed wireless communication system having frequency selective channel and a channel compensation method.

The United States patent document no. U.S. Pat. No. 9,014,665, discloses a method for communication includes generating one or more data streams for transmission to respective target receivers, and one or more jamming streams.

The United States patent document no. US2010265999, discloses a wireless radio transceiver system configured to transmit and receive a communications signal waveform having a time division multiple access physical layer structure and which includes a sequence of orthogonal frequency division multiple access symbols.

The United States patent document no. US2014153723, discloses system, device and method of physical layer security which is operable to transform user data in accordance with security characteristics and to process the transformed data into a format suitable for the communication channel and further operable to transmit the processed data onto the communication channel.

The United States patent document no. U.S. Pat. No. 8,433,894, discloses a method and an apparatus for performing physical layer security operation.

SUMMARY OF THE INVENTION

An objective of the present invention is to realize a secure and adaptive waveforms multiplexing system in advanced-level wireless communication systems (such as 5G and beyond systems).

BRIEF DESCRIPTION OF THE SEVERAL VIEWS OF THE DRAWINGS

"SECURE AND ADAPTIVE ORTHOGONAL DIVISION WAVEFORMS MULTIPLEXING SYSTEM USING CHANNEL-BASED TRANSFORMATION" realized to fulfil the objective of the present invention is shown in the FIGURE attached, in which.

Figure 1:
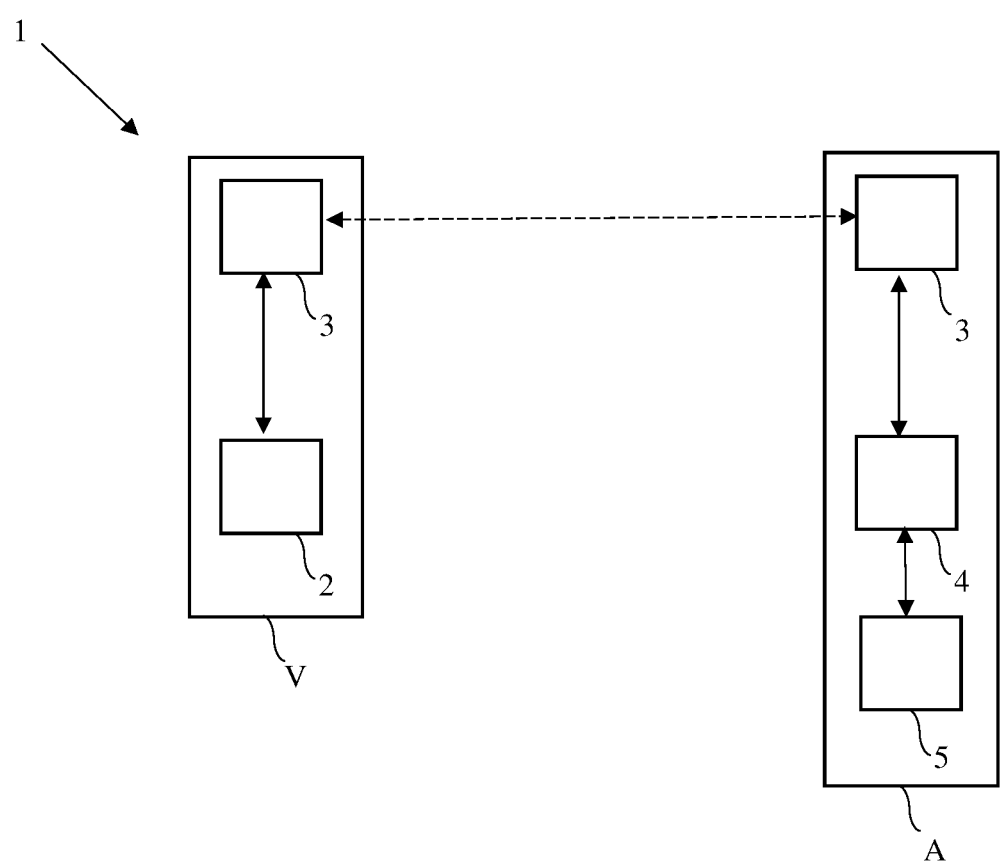
FIG. 1 is a schematic view of the inventive system.
Figure 2:
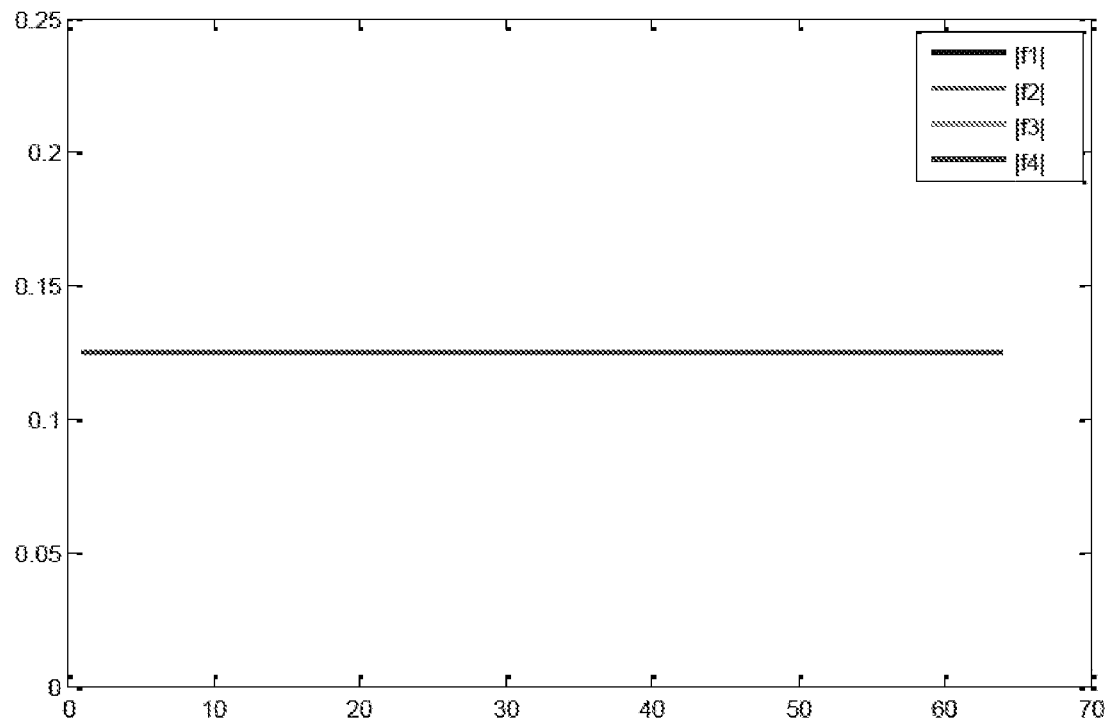
FIG. 2 and FIG. 3 are graphs which shows comparison between OFDM and OTDM in terms of the amplitude of the first four basis functions of the inverse Fourier and channel-based transform matrices given by $F^H$ and V (extracted from a channel with L=9 taps), respectively.
Figure 3:
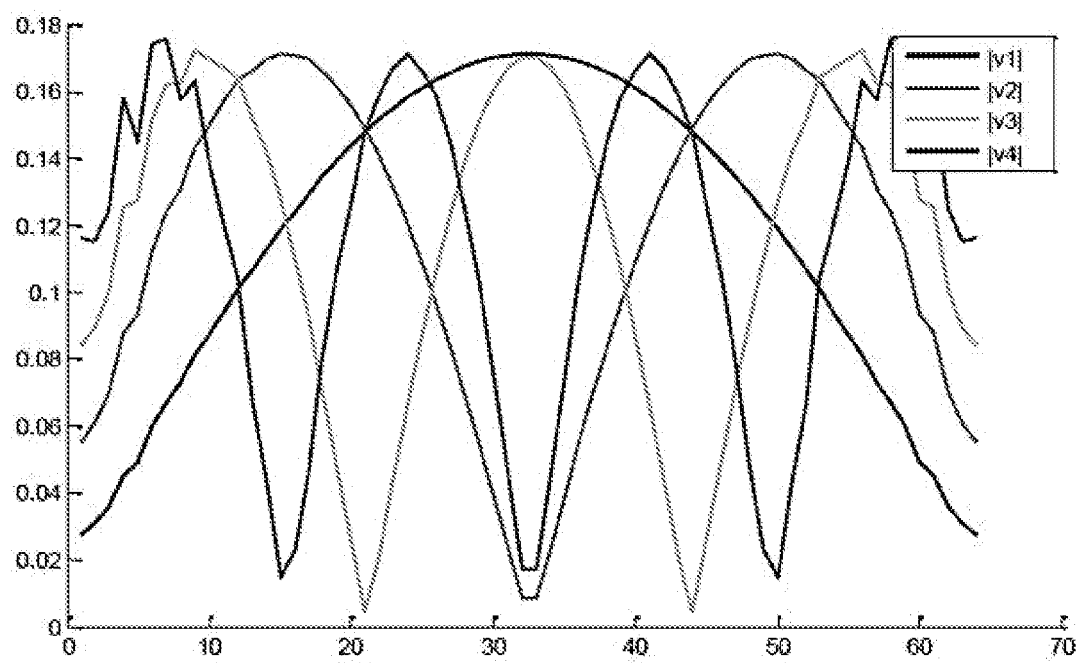
Figure 4:
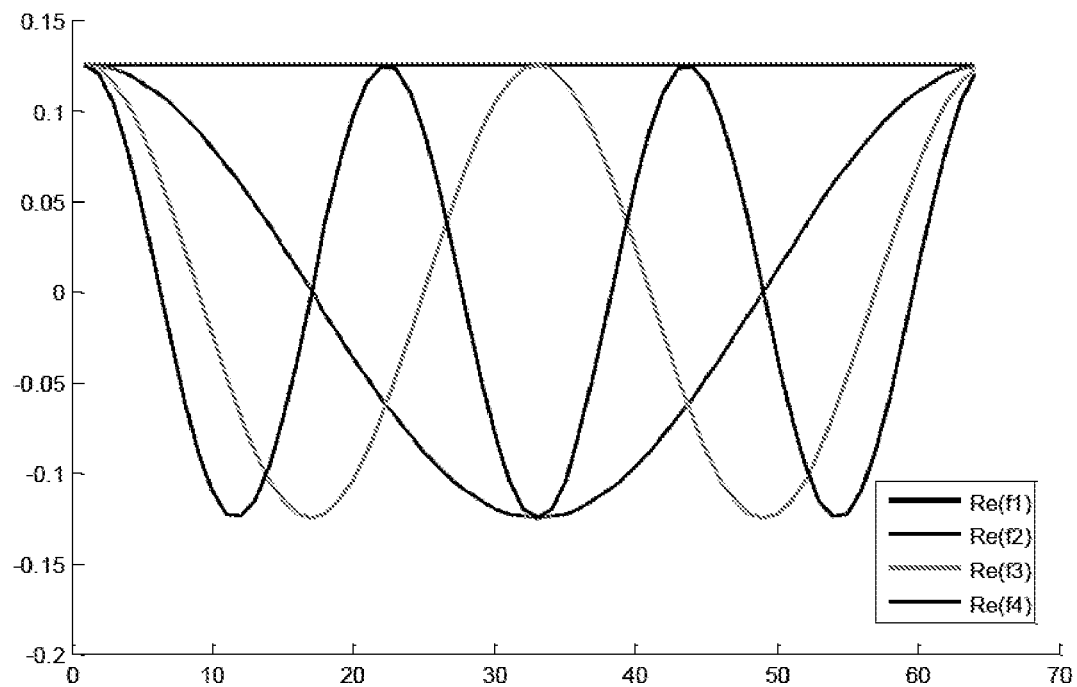
FIG. 4 and FIG. 5 are graphs which shows comparison between OFDM and OTDM in terms of the real part of the first four basis functions of the inverse Fourier and channel-based transform matrices given by $F^H$ and V (extracted from a channel with L=9 taps), respectively.
Figure 5:
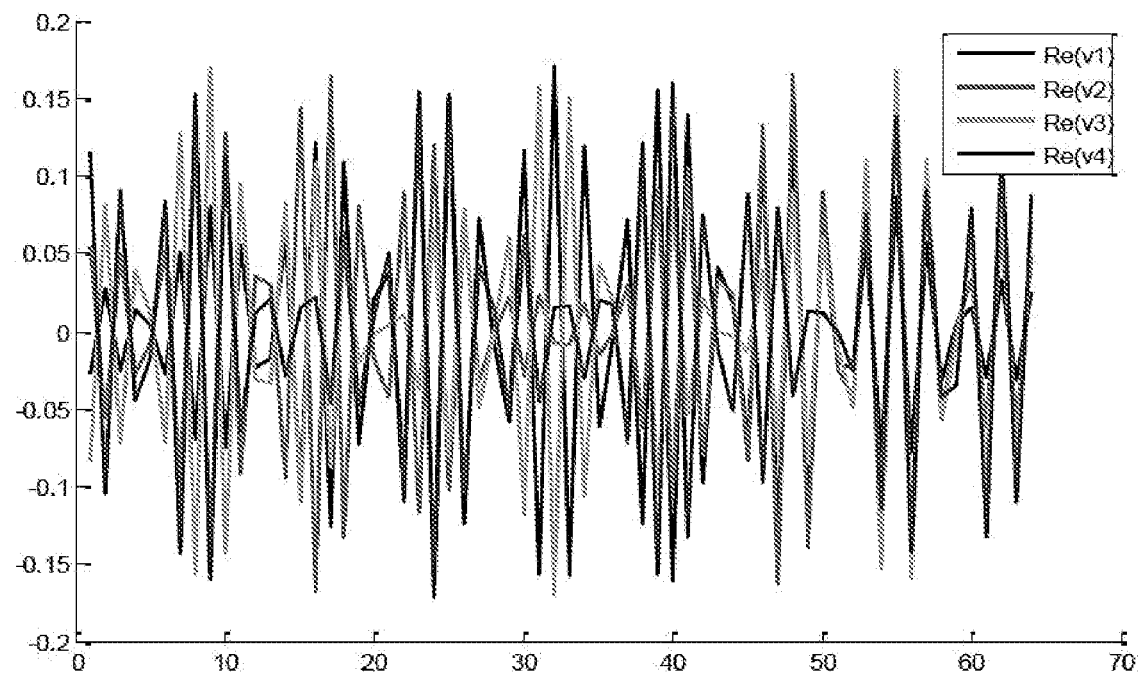
Figure 6:
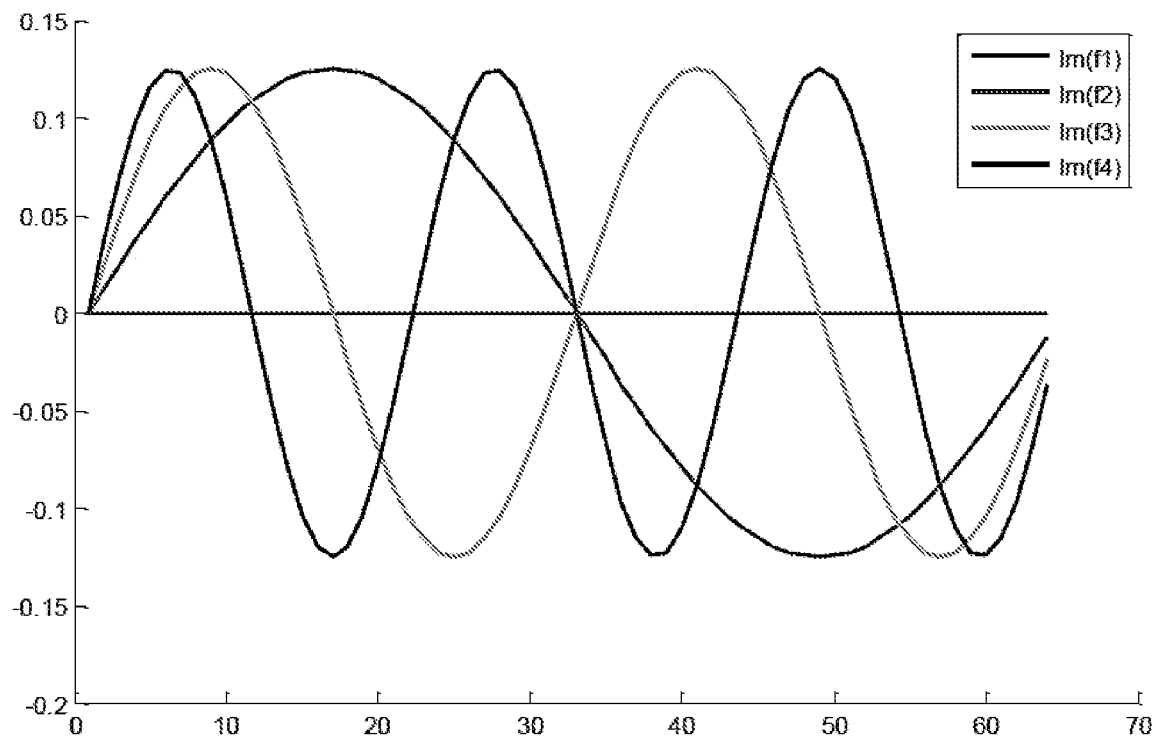
FIG. 6 and FIG. 7 are graphs which shows comparison between OFDM and OTDM in terms of the imaginary part of the first four basis functions of the inverse Fourier and channel-based transform matrices given by $F^H$ and V (extracted from a channel with L=9 taps), respectively.
Figure 7:
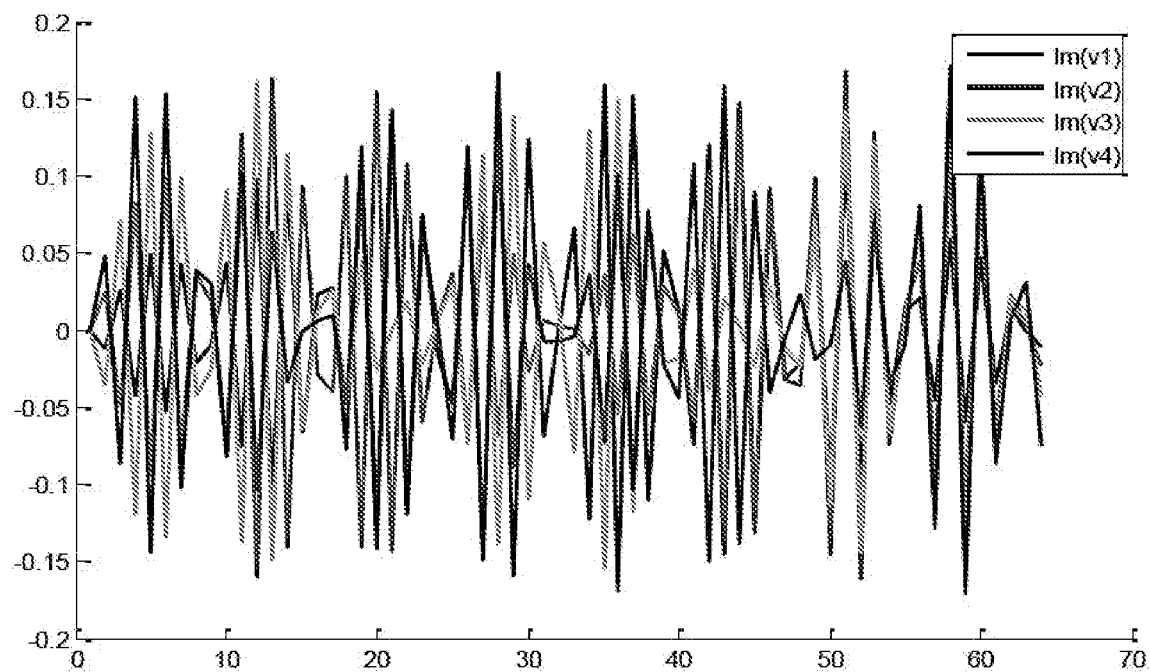
Figure 8:
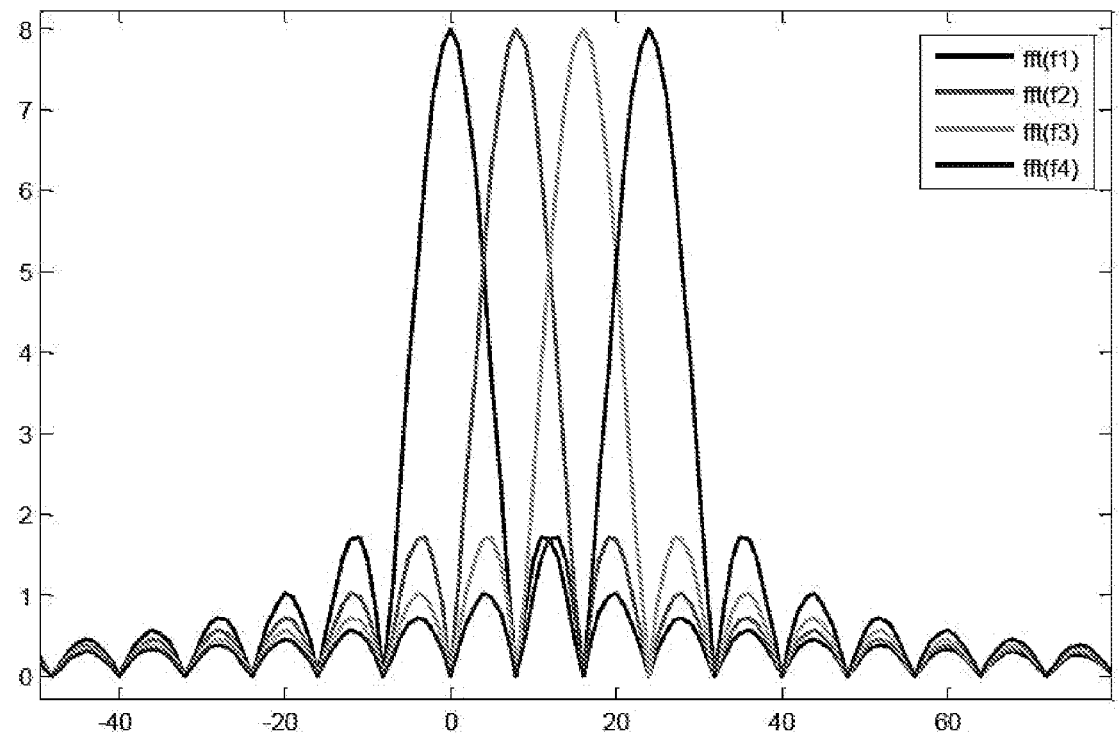
FIG. 8 and FIG. 9 are graphs which shows comparison between OFDM and OTDM in terms of the frequency of the first four basis functions of the inverse Fourier and channel-based transform matrices given by $F^H$ and V (extracted from a channel with L=9 taps), respectively.
Figure 9:
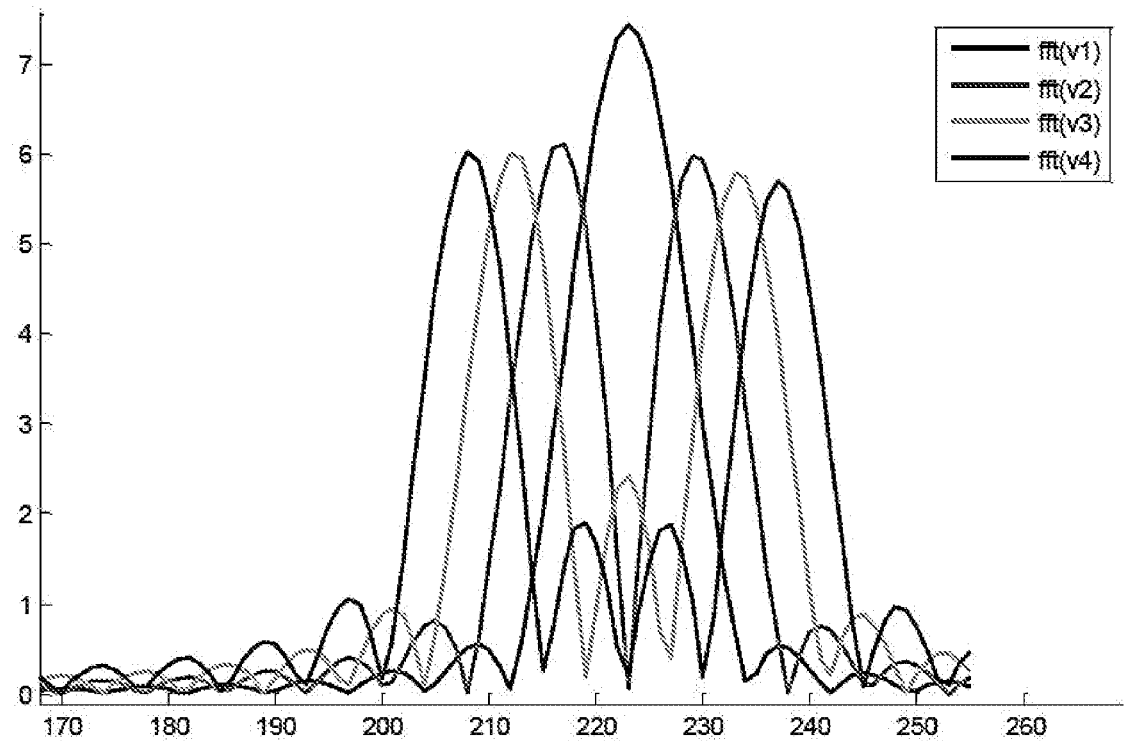
Figure 10:
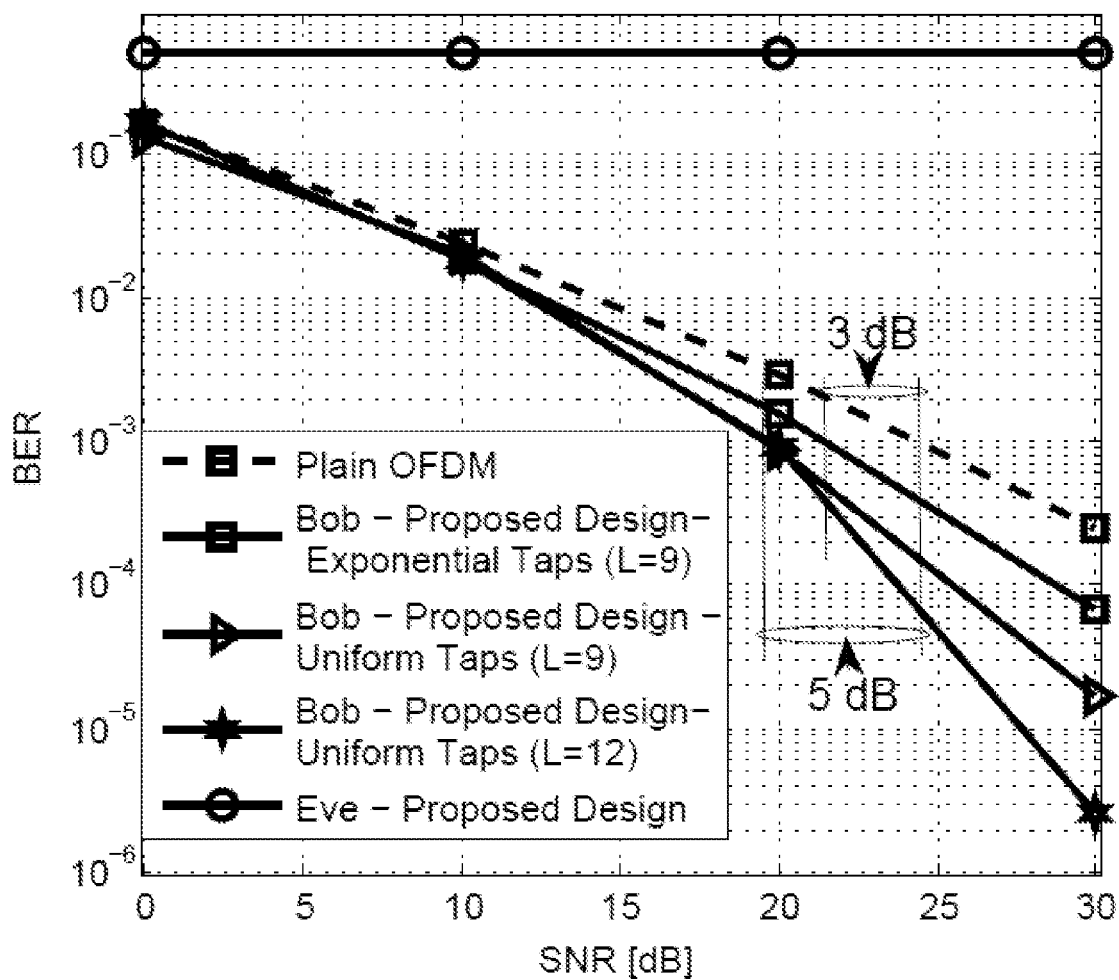

The components illustrated in the FIGURE are individually numbered, where the numbers refer to the following:
1. System
2. Waveform transformer
3. Waveform multiplexer
4. Transformation stabilizer
5. Waveform decoder
Tx: Transmitter
Rx: Receiver The inventive system (1) for a secure and adaptive waveforms multiplexing in advanced-level wireless communication systems comprises:
- at least one waveform transformer (2) which runs on the transmitter (Tx) and can transform the data—that are required to be transferred in the device—into waveform;
- at least two waveform multiplexers (3) which apply filter and security period to the waveforms received from the waveform transformer (2) side by running on the transmitter (Tx) and multiplies the said waveforms applying channel-based transmit precoding, and can expand the waveforms received from the channel side by running on the receiver (Rx) in order to filter them;
- at least one transformation stabilizer (4) which increases efficiency of the receiver (Rx) by adjusting the waves whose length is equal to the length of the data block size plus the receiver's (Rx) channel spread length received from the waveform multiplexer (3) by decoding including receiver's (Rx) channel spread length effect so as to transform them into data; and
- at least one waveform decoder (5) which can transform the waveforms received from the transformation stabilizer (4) by running on the receiver (Rx) in order that they are used by the receiver (Rx) side upon interpreting them (FIG. 1).

The waveform transformer (2) included in the inventive system (1) is configured such that it can run on the transmitter (Tx) on a device which can perform data exchange with wireless networks.

The waveform transformer (2) is configured such that it can carry out interpretation of data blocks which are provided on the device and transferred to the transmitter (Tx) direction so as to be sent.

The waveform transformer (2) is configured such that it can transform the said data to be transferred, from serial data bus into parallel data bus after interpreting the data bocks.

The waveform transformer (2) is configured such that it can make a plurality of waveform entries into the waveform multiplexer (3) at the same time by making the data buses parallel.

The waveform multiplexer (3) included in the inventive system (1) is configured such that it can receive waveform entry from the waveform transformer (2) by means of a plurality of data buses.

The waveform multiplexer (3) is configured such that it can run on the transmitter (Tx) on a device which can perform data exchange with wireless networks.

The waveform multiplexer (3) is configured such that it will multiply and then add the waveforms by vectors on a channel-based orthogonal time basis.

The waveform multiplexer (3) is configured such that it can filter waveforms.

The waveform multiplexer (3) is configured such that it can transform the waveforms added by thereof from parallel data bus into serial data bus.

The waveform multiplexer (3) is configured such that it can add protection period to the said processed waveforms that it will send to the channel by means of the transmitter (Tx).

The waveform multiplexer (3) is configured such that it can run on the receiver (Rx) on a device which can perform data exchange with wireless networks.

The waveform multiplexer (3) is configured such that it transform the data bus of the waveforms, which are received by means of the channel, from serial into parallel.

The waveform multiplexer (3) is configured such that it will multiply and then add the waveforms, which are received from the channel by the receiver (Rx) in order to reduce the wave scattering effect by the time elapsed on the channel side and to prevent wave symbol return, by vectors on a channel-based orthogonal time basis.

The waveform multiplexer (3) is configured in order to transfer the waveforms processed to the transformation stabilizer (4) to a plurality of waveforms at the same time by means of parallel data bus.

The transformation stabilizer (4) included in the inventive system (1) is configured such that it can run on the transmitter (Tx) on a device which can perform data exchange with wireless networks.

The transformation stabilizer (4) is configured in order to receive a plurality of waveforms from the waveform multiplexer (3) at the same time by means of parallel data bus.

The transformation stabilizer (4) is configured such that it will increase efficiency by reducing energy expenditure on the system (1) upon balancing transformation of the received waveforms.

The transformation stabilizer (4) is configured such that it will filter the noise before the waveforms are transformed.

The transformation stabilizer (4) is configured such that it can transfer the processed waveform to the waveform decoder (5) as a plurality of waveforms at the same time by means of parallel data bus.

The waveform decoder (5) included in the inventive system (1) is configured such that it can run on the receiver (Rx) on a device which can perform data exchange with wireless networks.

The waveform decoder (5) is configured in order to receive a plurality of waveforms from the transformation stabilizer (4) at the same time by means of parallel data bus.

The waveform decoder (5) is configured in order to transform the said waveform into the data to be used by the electronic device upon obtaining the waveform protected by the protection period and processed from the transformation stabilizer (4).

With the said system (1), data of the electronic device in the transmitter (Tx) position are transferred to the waveform transformer (2). The data format is transformed into waveform by applying various mathematical operations in the waveform transformer (2) and a plurality of waveforms are transferred to the waveform multiplexer (3) at the same time. The waveform multiplexer (3) multiplies the obtained waveform on a channel-based orthogonal time basis and adds all waveforms. Before being transferred to the channel by means of the transmitter (Tx), the waveform multiplexer (3) loads protection period to the processed waveform so as to be decoded in the waveform decoder (5).

In accordance with the present system (1), mathematical model is explained considering a single-input single-output (SISO) system, in which a transmitter (Tx), called Alice, communicates with a legitimate receiver (Rx), called Bob, whereas an eavesdropper, called Eve, tries to intercept the communication between the two legitimate parties (Alice and Bob). The goal is basically to design joint adaptive Tx/Rx waveforms based on the channel realizations, so that optimal transceiver design and physical layer security can be simultaneously achieved.

The total number of information symbols, within one transmission block s, is N, where s is represented as follows:

$$S=[s_0\ s_1\ \ldots\ s_{N-1}]^T \in C^{[N \times 1]} \quad\quad 1$$

Each one of the complex base-band modulated symbols, si, is filtered or carried by a certain channel-based orthogonal pulse v vi, where the filtering process, in this case, is basically implemented via a simple multiplication operation between each data symbol and an orthogonal base vector. For the N data symbols to be transmitted, we need N carrying orthogonal basis vectors (pulses), which can be taken from the column vectors of V, given by;

$$V=[V_0\ V_1\ \ldots\ V_{N-1}]^T \in C^{[N \times N]} \quad\quad 2$$

Hence, V can be seen as the channel-based transformation matrix, which changes based on the legitimate user's channel. Also, each $i^{th}$ column vector (base) in V can be expressed as;

$$V_1=[V_0\ V_1\ \ldots\ V_{N-1}]^T \in C^{[N \times 1]} \quad\quad 3$$

After multiplying each symbol with its corresponding base vector, we take the sum of all resulting contributions to get a block of samples, x, referred to as one OTDM (Optical Time Division Multiplexing) symbol. This process can mathematically be stated as;

$$x = \sum_{i=0}^{N-1} s_i * v_i \in C^{[N \times 1]} \quad\quad 4$$

which can be further simplified into a matrix form, as;

$$x=V*s \in C^{[N \times 1]} \quad\quad 5$$

In order to avoid the interference between consecutive adjacent blocks, known as inter-block interference (IBI), zero-padding, as a guard period interval with length equal to the length of the channel delay spread L, is appended to the end of each block. Zero-tail in our design can be understood as an off-transmission period. Additionally, extra unnecessary extension in guard period is avoided since the guard period length is set to be equal to the channel spread. After appending the zero-tail to the OTDM symbol x, the OTDM symbol is sent through L-path slowly varying frequency selective fading channel with impulse response which is;

$$h_b=[h_0\ h_1\ \ldots\ h_{L-1}] \in C^{[L \times 1]} \quad\quad 6$$

In practical systems, the block length is determined by taking into consideration the coherence time, which is the maximum time duration over which the channel state is considered to be not varying (almost constant). The base-band received signal at the trusted user's (Bob) side can be given as;

$$y = h_b * x + z_b \in C^{[(N+L-1) \times 1]} \quad\quad 7$$

$$y_i = \sum_{i=0}^{L-1} h_i * x_{(i-1)} + z_{b(i)} \quad\quad 8$$

where y is the received block of one OTDM symbol and $z_b$ is the zero-mean complex additive white Gaussian noise (AWGN) at Bob's side. The previous convolution form can also be equivalently written in a linear algebraic matrix form, as;

$$y=H_b*X+_b=H_b*V*s+Z_b \in C^{[(N+L-1) \times 1]} \quad\quad 9$$

where Hb is the toeplitz matrix of the fading channel realization between the Tx (Alice) and the legitimate Rx (Bob), given by $$H_b = \begin{bmatrix} h_0 & 0 & 0 & \ldots & 0 \\ h_1 & h_0 & 0 & \ldots & 0 \\ h_2 & h_1 & h_0 & \ldots & 0 \\ . & . & h_1 & \ldots & 0 \\ . & . & . & \ldots & . \\ h_{L-1} & h_{L-2} & . & \ldots & . \\ 0 & h_{L-1} & h_{L-2} & \ldots & . \\ 0 & 0 & h_{L-1} & \ldots & . \\ . & . & . & \ldots & . \\ . & . & . & \ldots & . \\ 0 & 0 & 0 & \ldots & h_{L-1} \end{bmatrix}$$

At the receiver (Rx), a channel-based transformation is performed on y, using a matrix U consisting of multiple orthogonal bases (pulses), which are optimally extracted from the channel to diagonalize the channel response. This process is then followed by equalization, in the transform domain, using a diagonal matrix E. The process of extracting and using these matrices (U and E) will be discussed in the next section. On the other hand, the signal captured by Eve, with L paths, is given by $$y_e=H_e*x+z_e=H_e*V*s+z_e \in C^{[(N+L-1) \times 1]} \quad\quad 10$$

where $H_e$ and $z_e$ are the complex Toeplitz channel response matrix and AWGN of Eve, respectively. Moreover, since Eve is a passive node, the realistic assumption, where Alice has knowledge on Bob's channel, but no information about Eve's channel $H_e$, is adopted. Also, Eve is assumed to know the transmission technique and thus tries to extract, from its available channel, orthogonal pulses to use them in its detection process. As a final notice, both Bob and Eve are assumed to experience independent channel realizations because the wireless channel response is unique to the locations of the transmitter (Tx) and receiver (Rx) as well as the environment. Therefore, $H_b$ and $H_e$ are assumed uncorrelated. The transform domain (analogous to the frequency domain) is obtained as a result of using V at the transmitter (Tx) and U at the receiver (Rx), as follows:

$$H_b=U*E*V^H \quad\quad 11$$

The design starts by taking the hermitian (conjugate transpose) of the right and left matrices, resulting from applying singular value decomposition (SVD) on Hb, i.e., $V^H$ and U, to get V and $U^H$, respectively.

The process of assigning data symbols to pulses and then summing they all can easily be implemented in a matrix form as in equation 5. When x passes through the channel and reaches the legitimate receiver (Rx), the received OTDM block becomes as follows;

$$y=H_b*V*s+z=U*E*s+z \quad\quad 12$$

As seen from the previous equation, since Hb can equivalently be written in terms of its SVD, then the precoding matrix V used at the transmitter (Tx) cancels the effect of the right part $V^H$ of the channel since their multiplication results in an identity matrix. Thus, the net received signal can be reformulated as;

$$y=U*E*s+z \qquad 13$$

To remove the effect of the time dispersion brought by the channel spread and symbol rotation caused by the left part of the channel U, the receiver (Rx) needs to multiply the received signal by $U^H$ as follows;

$$U^H*y=E*s+U^H*z=E*s+z\char`\^ \qquad 14$$

where $z\char`\^=U^H*z$ and because of the unitary nature of matrix $U^H$, $z\char`\^$ has the same statistics and characteristics as z. The estimated data symbols can be obtained through equalizing the effect of the diagonal matrix E, which contains the power (spectrum) of the channel over each data symbol. This simple equalization process is given as;

$$s\char`\^=E^{-1}*U^H*y=E^{-1}(E*s+U^H*z) \qquad 15$$

$$s\char`\^=s+E^{-1}*U^H*z=s+E^{-1}*z\char`\^ \qquad 16$$

With this operation, the scattering effect occurring during the transfer period is reduced by the channel. At the end of the operation, the transformation stabilizer (4) receives the collected waveforms and carries out the power optimization spent on the system (1) by a filter. The waveform decoder (5), which obtains the processed waveform from the transformation stabilizer (4), interprets the waveform and decodes the protection period and transforms it into data blocks transmitted by the transmitter (Tx). The transformed data blocks are transferred to the user's electronic device by means of the receiver (Rx).

Within these basic concepts; it is possible to develop various embodiments of the inventive "Secure and Adaptive Orthogonal Division Waveforms Multiplexing System Using Channel-Based Transformation (1)", the invention cannot be limited to examples disclosed herein and it is essentially according to claims.

The invention claimed is:

1. A system for secure and adaptive waveform multiplexing in advanced-level wireless communications, the system comprising:
   at least one waveform transformer that runs on a transmitter so as to transform data into a waveform;
   at least one waveform decoder that transforms waveforms received from a transformation stabilizer by running on a receiver so as to decode the waveform from the transformation stabilizer;
   at least two waveform multiplexers that filter and secure the waveform received from said at least one waveform transformer by running on the transmitter, said at least two waveform multiplexers multiplying the waveform by applying channel-based transmit precoding and expanding the waveforms received from a channel;
   at least one transformation stabilizer that adjusts the waveforms having a length equal to a length of a data block plus a channel spread length of the receiver as received from said at least two waveform multiplexers, the waveforms being transformed into data by decoding by said at least one waveform decoder based on the channel spread length.

2. The system of claim 1, wherein said at least one waveform transformer is configured to run on the transmitter on a device that performs data exchange with a wireless network.

3. The system of claim 1, wherein said at least one waveform transformer is configured to interpret data blocks that are transmitted toward the transmitter.

4. The system of claim 3, wherein said at least one waveform transformer is configured to transform data to be transferred from a serial data bus into a parallel data bus after the interpreting of the data blocks.

5. The system of claim 4, wherein said at least one waveform transformer is configured to make a plurality of waveform entries into said at least two waveform multiplexers simultaneously by making a plurality of the parallel data buses.

6. The system of claim 5, wherein said at least two waveform multiplexers are configured to receive one of the plurality of waveform entries from said at least one waveform transformer by the plurality of parallel data buses.

7. The system of claim 1, wherein said at least two waveform multiplexers are configured to run on the transmitter on a device that performs data exchange with a wireless network.

8. The system of claim 1, wherein said at least two waveform multiplexers is configured to multiply the waveforms and add the waveforms by vectors on a channel-based orthogonal time basis.

9. The system of claim 1, wherein said at least two waveform multiplexers are configured to filter waveforms.

10. The system of claim 1, wherein said at least two waveform multiplexers are configured to transform collected, waveforms from a parallel data bus into a serial data bus.

11. The system of claim 1, wherein said at least two waveform multiplexers are configured to add a protection period to processed waveforms so as to send the processed waveforms to the channel by the receiver.

12. The system of claim 11, wherein said at least one waveform decoder is configured to transform the waveform into the data upon receiving the waveform protected by the protection period and processed from adjacent at least one transformation stabilizer.

13. The system of claim 1, wherein said at least two waveform multiplexers are configured to run on the receiver on a device that performs data exchange with a wireless network.

14. The system of claim 1, wherein said at least two waveform multiplexers are configured to transform of a data bus of the waveforms that are transmitted by the channel from serial to parallel.

15. The system of claim 1, wherein said at least two waveform multiplexers are configured to multiply the waveforms.

16. The system of claim 1, wherein said at least two waveform multiplexers are configured to transfer the waveforms processed by said at least one transformation stabilizer into a plurality of waveforms simultaneously by a parallel data bus.

17. The system of claim 1, wherein said at least two waveform multiplexers are configured to run on the transmitter on a device that performs data exchange with a wireless network.

18. The system of claim 1, wherein said at least one transformation stabilizer is configured to receive a plurality of waveforms from said at least two waveform multiplexers simultaneously by a parallel data bus.

19. The system of claim 1, wherein said at least one transformation stabilizer is configured to balance a transformation of received waveforms.

20. The system of claim 1, wherein said at least one transformation stabilizer is configured to filter noise prior to transformation of the waveforms.

21. The system of claim 1, wherein said at least one transformation stabilizer is configured to transfer a processed waveform to said at least one waveform decoder as a plurality of waveforms simultaneously by means of a parallel data bus.

22. The system of claim 1, wherein said at least one waveform decoder is configured to run on the receiver on a device that performs data exchange with a wireless network.

23. The system of claim 1, wherein said at least one waveform decoder is configured to receive a plurality of waveforms from said at least one transformation stabilizer simultaneously by means of a parallel data bus.

* * * * *